Feb. 14, 1939.  C. G. OLSON  2,147,209
FASTENING DEVICE
Filed Sept. 13, 1935
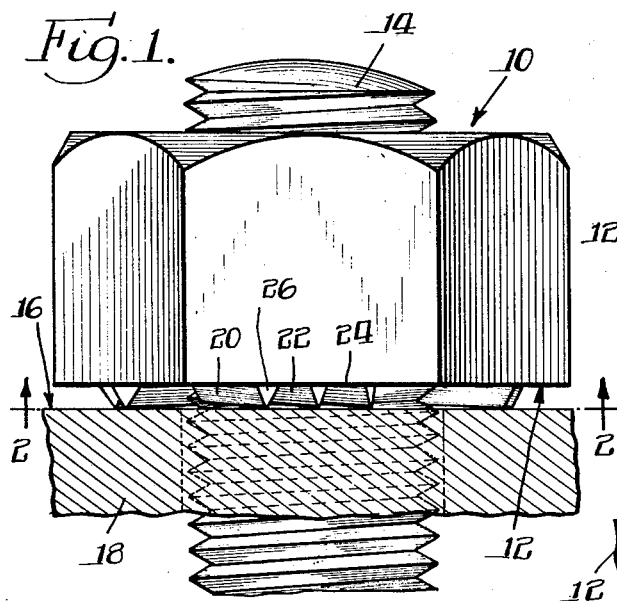
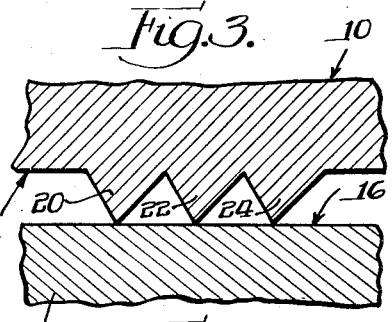
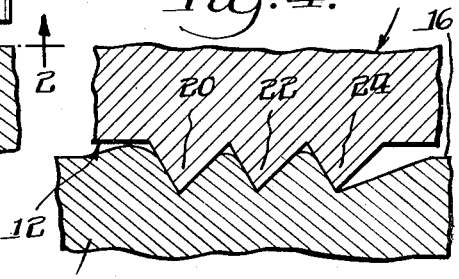
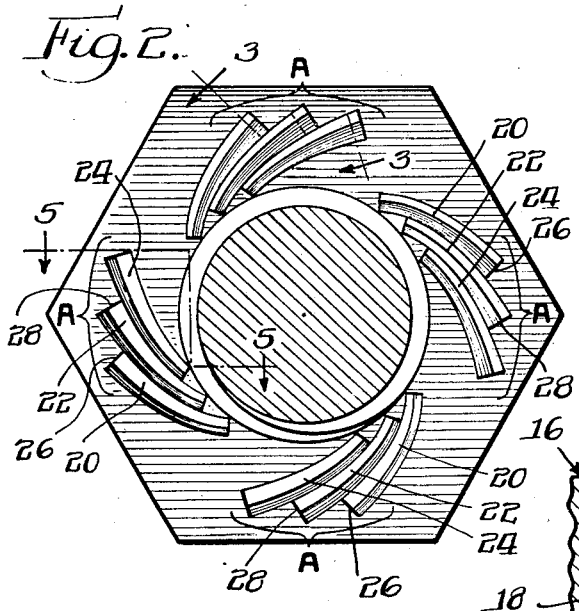
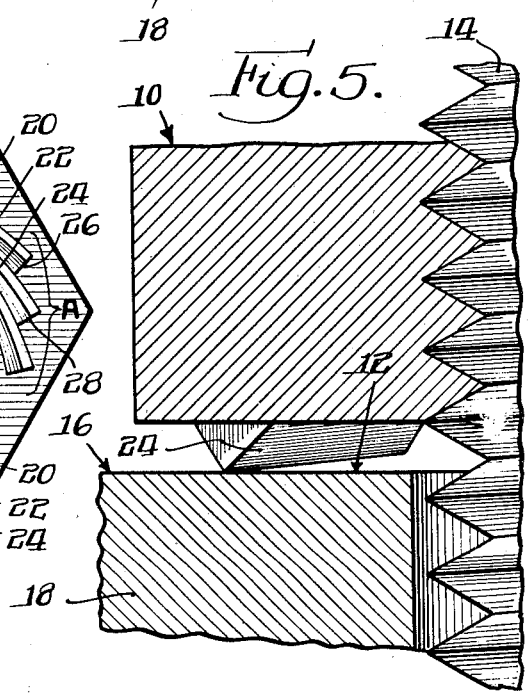
Inventor:
Carl G. Olson
By: Cox & Moore
attys.

Patented Feb. 14, 1939

2,147,209

UNITED STATES PATENT OFFICE 2,147,209

FASTENING DEVICE

Carl G. Olson, Chicago, Ill., assignor to Illinois Tool Works, Chicago, Ill., a corporation of Illinois Application September 13, 1935, Serial No. 40,465

4 Claims. (Cl. 151—37)

This invention relates generally to locking or fastening devices and more particularly to improvements in threaded fasteners and the like.

It is an object of my invention to provide the clamping surface of a threaded fastener, bolt head or nut with means for rendering the same self-locking when clamped against the surface of a work piece.

The invention contemplates the provision, in association with a rotary clamping surface, of fastener work engaging elements, as for example protuberances designed to cause a cold flowing of the material of the work piece into locking engagement with an abutment in response to the rotary tightening action of the fastener.

Still more specifically the invention contemplates work engaging elements or protuberances as mentioned above which are arranged in groups or locking sections, each protuberance having an edge or surface extending tangentially or spirally with respect to the fastener axis and designed to "plow" into the surface of the work piece for the purpose of shifting sections thereof into locking association with abutment surfaces of adjacent protuberances.

The foregoing and other objects will be more readily appreciated from the following detailed description particularly when considered in connection with the accompanying drawing where-in—

Fig. 1 discloses a side elevational view of a threaded fastener or nut, the clamping surface of which is provided with locking sections formed in accordance with the teachings of the present invention, said nut being shown in operative association with a fragmentary portion of a work piece and screw;

Fig. 2 is a view of the under side or clamping surface of the nut in Fig. 1, said view being taken substantially along the line 2—2 of Fig. 1;

Fig. 3 is an enlarged fragmentary transverse sectional view of the work engaging elements or protuberances disclosed in initial engagement with the surface of the work, said view being taken substantially along the line 3—3 as indicated in Fig. 2;

Fig. 4 is a view similar to Fig. 3 disclosing the relative positions occupied by the protuberances and the surface of the work piece after the nut or fastener has been tightened against the work; and Fig. 5 is an enlarged fragmentary view of the nut and work piece for the purpose of more clearly illustrating the structural characteristic of the protuberance or work "plowing" element positioned between the clamping surface of the nut and the surface of the work.

Referring now to the drawing more in detail wherein I have employed like characteristics to denote similar parts in the various figures it will be seen that one embodiment of my invention contemplates a rotary threaded fastener or nut designated generally by the numeral 10. The nut 10 as shown in Fig. 1 is provided with the usual clamping surface 12 adapted when the nut is tightened on the screw 14 to clampingly engage the surface 16 of a work piece 18. To render the nut secure against inadvertent or unauthorized loosening I provide along the clamping surface 12 thereof groups of locking sections A.

In the disclosed embodiment each locking section A includes what I prefer to designate as a leading metal shifting or metal plowing element 20, an intermediate plowing element 22 and a trailing element 24. These plowing elements or protuberances preferably extend tangentially or spirally with respect to the axis of the nut. In other words these metal shifting elements do not extend radially nor do they extend in circular fashion with respect to the axis of the nut. The outer extremity of each element 20 presents an abutment surface 26 and likewise the outer extremity of each element 22 presents an abutment surface 28.

Each of the metal flowing elements is preferably formed with a relatively sharp edge which results from their V-shaped cross section, so that when the nut is advanced toward the work these edges plow their way into the surface 16 of the work. To facilitate this plowing or embedding action of the metal shifting elements I prefer to decrease the height thereof as they extend toward the inner portion of the nut. This will be more clearly apparent from the disclosure in Figs. 1 and 5.

In Fig. 1 I have shown the work engaging edges of the plowing elements or protuberances in initial engagement with the work surface 16. Continued rotation of the nut in the tightening direction causes these to form furrows within the work surface and finally to reach the position as indicated in Fig. 4. Particular attention is directed to the fact that the tangential or spiral arrangement of the plowing elements not only causes a furrow to be plowed into the work surface 16 but also causes the cold flowing of the material in the work in a radial direction. That is to say, as the groups of protuberances or projections are shifted through a circular path, the material which is thrown up at the advancing side of each projection is urged outwardly. It must be appreciated of course that the cold flowing of the work as indicated in Fig. 4 has been somewhat idealized in order to more clearly convey the functional characteristics of the projections 20—22—24.

Bearing in mind the tendency for sections of the work surface to be shifted by cold flowing in a radial direction as a result of the tangential or spiral disposition of the locking sections it will be seen that some of the material thus shifted will become lodged against the abutment surfaces 26 and 28 of the locking sections A. Thus when the nut 10 has been tightened against the work surface 16 so as to bring the clamping surface 12 of the nut against said work surface, retrograde rotation can not be experienced by the nut without overcoming the locking effectiveness of the sections of the work surface which has been shifted by cold flowing into locking engagement with the abutment surfaces 26 and 28.

In addition to the locking effectiveness of the shifted work sections engaging the abutment surfaces 26 and 28, the trailing sides of, for example, the locking sections 20 and 22, are engaged by the material of the work surface caused to flow into engagement therewith due to the plowing action of the next adjacent spiral projection. Thus the tangential or spiral disposition of the projections serves during the tightening operation to not only cause the flow of sections of the work surface into locking engagement with the abutment surfaces 26 and 28 but also to cause the flow of such material into locking engagement with the trailing sides or surfaces of the elements 20 and 22.

From the foregoing it will be apparent that the metal shifting elements or protuberances, in order to be effective in securing the nut against retrograde movement, must be harder than the material of the work. I prefer to harden these elements sufficiently so that when they are tightened against the work they will cause the cold flowing thereof without experiencing any substantial injury or disfigurement. It should also be apparent that while I have disclosed the locking sections in a particular type of groups and comprising elements of particular tangential and spiral form, said sections may be structurally varied or modified without departing from the spirit and scope of the claims appended hereto. It is important that these plowing or metal flowing elements be so disposed with respect to the axis of the fastener that when they are shifted along a circular path resulting from the rotation of the fastener, the cold flowing of the work will take place in a direction which is inclined with respect to the direction of movement of the locking sections. That is to say, each plowing element of the locking sections is in itself inclined with respect to the direction of circular movement experienced thereby and thus causes the material of the work to flow radially of the fastener axis. Stating it in another way, the protuberances of each locking section extend in a direction which is inclined to a radial line traversing the sections and hence as said sections move in a circular path they impart a cold flowing to the work in a direction which is inclined to the direction in which the elements of the locking sections extend. It will also be apparent from the foregoing description that I propose to provide non-concentric ribs or protuberances adapted to cause the material of the work to flow. These non-concentric ribs are arranged in lateral overlapping relationship, as viewed in Figure 2. In other words, each of the protuberances overlaps a portion of the next adjacent protuberances. Obviously the invention is not limited for use on a rotary fastener of any particular shape but is designed for use on threaded fasteners which vary in size and shape. As stated above, the invention should be limited only by the scope of the claims which follow.

As set forth at the end of the descriptive matter in my issued Patent No. 2,037,586, the subject matter of Figures 26 to 28, inclusive, of that patent is claimed generically but not specifically therein, specific claims to that subject matter being incorporated herein. That is to say, claims directed to non-radial or circumferentially extending work shifting elements are included herein as distinguished from the generic claims set forth in my above mentioned patent.

Having thus described my invention, what I claim as new and desire to secure by Letters Patent is:

1. A rotary fastener adapted to be clamped against the surface of a work piece, including a rotary threaded body, and a locking section on said body including a plurality of spirally disposed elements traversing the clamping side of said rotary body adapted to dig into and displace material of the work and to urge displaced material radially outward during the tightening of the fastener, said locking section also including an abutment surface cooperatively arranged with respect to said elements, at least one of said elements being adapted in response to rotary tightening movement experienced by the body to cause a section of the work piece to be shifted into locking association with said abutment surface whereby to prevent loosening of the fastener.

2. A rotary fastener adapted to be clamped against the surface of a work piece, including a rotary threaded body, and a locking section on said body including a plurality of non-concentric elements positioned side by side and traversing the clamping side of said rotary body, said elements being adapted to dig into and displace material of the work and to urge displaced material radially outward during the tightening of the fastener, said locking section also including an abutment surface cooperatively arranged with respect to said elements, at least one of said elements being adapted in response to rotary tightening movement experienced by the body to cause a section of the work piece to be shifted into locking association with said abutment surface whereby to prevent loosening of the fastener.

3. A rotary fastener adapted to be clamped against the surface of a work piece, including a rotary threaded body, and a locking section on said body including an abutment section and a circumferentially extending element adapted in response to rotary tightening movement experienced by the body to cause a section of the work piece positioned laterally outward from the threaded portion of the body to be radially shifted into locking association with said abutment section whereby to prevent loosening of the fastener.

4. A rotary fastener adapted to be clamped against the surface of a work piece, including a rotary threaded body, and a locking section on said body including an abutment section and a non-radial element adapted in response to rotary tightening movement experienced by the body to cause a section of the work piece positioned laterally outward of the threaded portion of said body to be shifted into locking association with said abutment section whereby to prevent loosening of the fastener.

CARL G. OLSON.